United States Patent [19]

Arterbury

[11] Patent Number: 5,004,049
[45] Date of Patent: Apr. 2, 1991

[54] LOW PROFILE DUAL SCREEN PREPACK

[75] Inventor: Bryant A. Arterbury, Houston, Tex.

[73] Assignee: Otis Engineering Corporation, Carrollton, Tex.

[21] Appl. No.: 470,177

[22] Filed: Jan. 25, 1990

[51] Int. Cl.5 .............................................. E21B 43/08
[52] U.S. Cl. .................................... 166/228; 166/230; 166/233
[58] Field of Search ................ 166/228, 233, 230, 234, 166/236, 157; 210/291, 170, 497.01, 497.1

[56] References Cited

U.S. PATENT DOCUMENTS

| | | | |
|---|---|---|---|
| 1,256,830 | 2/1918 | Rodrigo, Sr. | 166/233 X |
| 1,992,718 | 2/1935 | Records | 166/230 X |
| 2,905,251 | 9/1959 | Church | 166/228 |
| 2,973,814 | 3/1961 | Adams et al. | 166/228 |
| 3,133,595 | 5/1964 | Loughney et al. | 166/228 |
| 3,768,557 | 10/1973 | Spurlock et al. | 166/228 |
| 3,785,409 | 1/1974 | Smith | 140/92.2 |
| 3,908,256 | 9/1975 | Smith | 166/233 X |
| 3,958,634 | 5/1976 | Smith | 166/233 |
| 4,284,138 | 8/1981 | Allred | 166/233 |
| 4,314,129 | 2/1982 | Wilson et al. | 219/58 |
| 4,416,331 | 11/1983 | Lilly | 166/236 |
| 4,434,054 | 2/1984 | Livesey et al. | 210/484 |
| 4,487,259 | 12/1984 | McMichael, Jr. | 166/228 |
| 4,526,230 | 7/1985 | Kojicie | 166/236 |
| 4,821,800 | 4/1989 | Scott et al. | 166/228 |
| 4,856,591 | 8/1989 | Donovan et al. | 166/278 |
| 4,858,691 | 8/1989 | Ilfrey et al. | 166/278 |

Primary Examiner—Stephen J. Novosad
Attorney, Agent, or Firm—Dennis T. Griggs

[57] ABSTRACT

A prepack sand screen assembly has resistance welded inner and outer screens concentrically mounted in radially spaced relation onto a perforated mandrel, thereby defining an annulus in which prepack gravel is loaded. The longitudinal spacing distance between adjacent turns of the inner and outer screens selectively exclude sand fines of a predetermined minimum size. The outer screen wire is substantially greater in size as compared to the corresponding dimension of the inner retention screen wire. The inner retention screen is radially spaced with respect to the perforated mandrel, thereby defining a bypass flow annulus. The effective inlet flow area through the inner retention screen is more than twice the effective inlet flow area through the outer screen. Accordingly, localized deposits of sand fines on the inner screen are effectively bypassed by the remaining flow passages formed across the inner retention screen. According to this arrangement, the dual screen prepack assembly excludes sand fines from inflowing formation fluid during the initial production phase following a gravel pack operation, without limiting production of formation fluid.

11 Claims, 3 Drawing Sheets

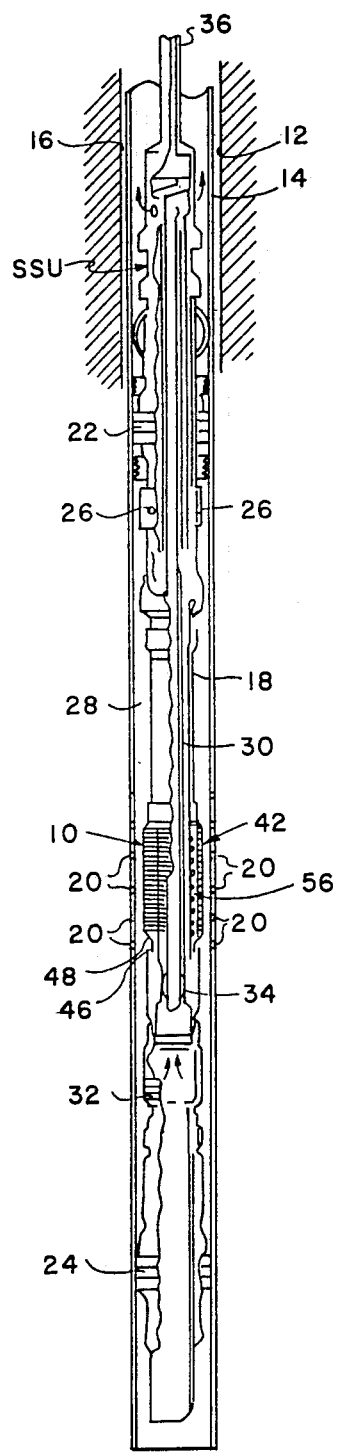
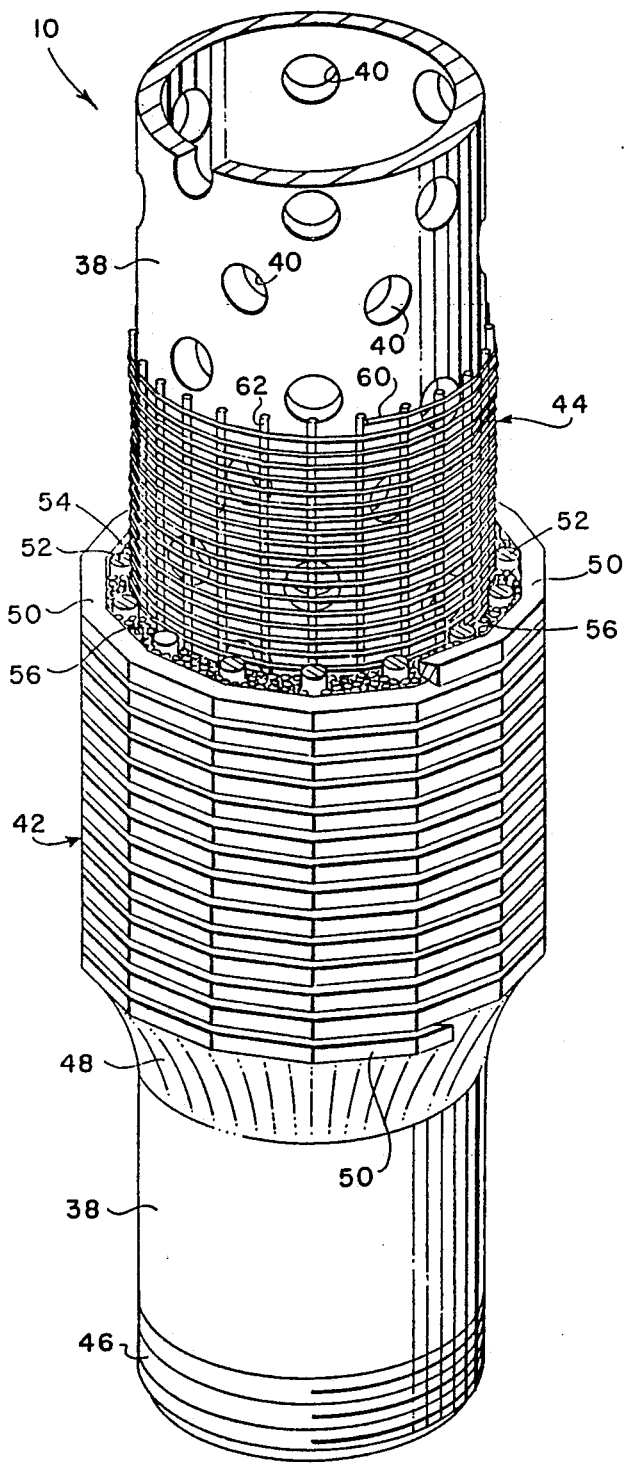
FIG. 1
FIG. 2

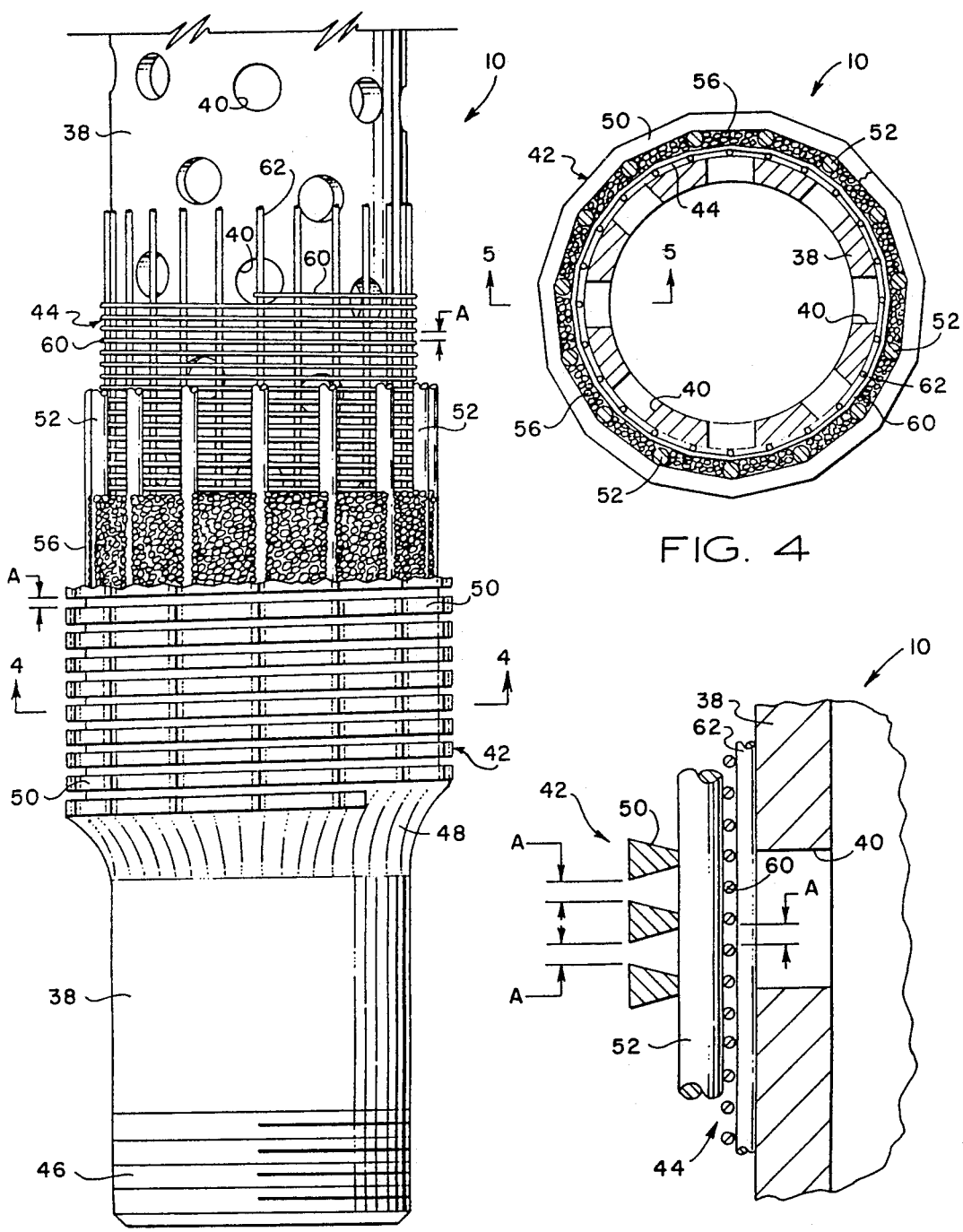

OUTER SCREEN INNER SCREEN

LOW PROFILE DUAL SCREEN PREPACK

FIELD OF THE INVENTION

This invention relates generally to apparatus for completing downhole wells, and in particular to well screens for filtering unconsolidated material out of inflowing well fluid in water, oil, gas and recovery wells.

1. Background of the Invention

In the course of completing an oil and/or gas well, it is common practice to run a string of casing into the well bore and then to run the actual production tubing inside the casing. At the well site, the casing is perforated across one or more production zones to allow production fluids to enter the casing bore. During production of the formation fluid, formation sand is also swept into the flow path. The formation sand is relatively fine sand that erodes production components in the flow path.

In some completions, the well bore is uncased, and an open face is established across the oil or gas bearing zone. Such open bore hole (uncased) arrangements are utilized, for example, in water wells, test wells and horizontal well completions.

One or more sand screens are installed in the flow path between the production tubing and the perforated casing (cased) or the open well bore face (uncased). A packer is customarily set above the sand screen to seal off the annulus in the zone where production fluids flow into the production tubing. The annulus around the screen is packed with a relatively coarse sand or gravel which acts as a filter to reduce the amount of fine formation sand reaching the screen. A work string and service seal unit (SSU) is used to spot the gravel around the screen. During well completion, gravel is also pumped and squeezed into the producing formation around the screen for filtering unconsolidated material out of the infilling well fluid. The gravel is pumped down the work string in a slurry of water or gel and is spotted directly under the packer or above the sand screen. The gravel also fills the annulus between the sand screen and the well casing. In well installations in which the screen is suspended in an uncased open bore, the gravel pack supports the surrounding unconsolidated formation.

2. Description of the Prior Art

Conventional sand screens employ a perforated mandrel which is surrounded by longitudinally extending spacer bars, rods or ribs and over which a continuous wire is wrapped in a carefully spaced spiral configuration to provide a predetermined axial gap between the wire turns. See, for example, U.S. Pat. No. 3,784,409; U.S. Pat. No. 3,958,634; and U.S. Pat. No. 3,908,256, all assigned to Howard Smith Screen Company of Houston, Texas, and each being incorporated herein by reference. The aperture between turns permits formation fluids to flow through the screen, while the closely spaced wire turns exclude fine particulate material such as sand or gravel which may penetrate the gravel pack.

A problem which arises during initial production following the gravel packing operation is that fine sand may be carried through the gravel pack before the gravel pack bridge stabilizes It is not unusual to produce a substantial amount of such fin sands before the gravel pack finally consolidates and yields clean production During the early stages of producing the well after gravel packing, those fines tend to migrate through the gravel pack and screen and lodge within the inner annulus between the outer wire wrap and the perforated mandrel In some instances, this can cause severe erosion of the screen and ultimate failure of the screen to reduce sand invasion In other situations, the sand fines may include plugging materials which are carbonaceous, siliceous or organic solids which can completely plug the mandrel flow passages and terminate production shortly after completion. In deep wells, when the screen becomes plugged and the pressure in the production tubing is reduced, the formation pressure can collapse the screen and production tubing. Moreover, when a substantial amount of sand has been lost from the surrounding formation, the formation may collapse with resultant damage to the well casing or liner and consequent reduction or termination of production.

One attempt to overcome the foregoing problem is to interpose a prepack of gravel within the annulus between the inner mandrel and the outer wire screen. The prepacked gravel is sized appropriately to exclude the fines which accompany the formation fluid during initial production. Raw gravel, as well as epoxy resin coated gravel, have been used extensively in prepacked well screens. Most prepacked well screens are subject to retrieval problems due to their outer diameter being larger than that of a conventional well screen. In order to make prepacked well screens more easily retrievable, the inner mandrel is usually downsized, therefore creating restrictions in both production and completion tool string sizing.

Some prior art well screens have utilized an inner wirecloth or steel woven fabric filter media in order to achieve maximum annular placement and retention of prepacked filter materials. See, for example, U.S. Pat. No. 4,858,691, and U.S. Pat. No. 4,856,591. Such woven wire cloth retainers do not provide free flow comparable to the conventional rib-channel design which is characteristic of resistance welded well screens. The wire-cloth retainer which is wrapped directly onto the perforated mandrel only permits free flow to occur where it overlaps flow passages on the mandrel. Even in this instance, flow through the perforations is further restricted where the wire cloth retainer overlaps itself.

The prior art sand screens which utilize fine wire woven cloth retainers can result in plugging due to the fact that the openings in the wire cloth are typically considerably smaller than the flow openings in the outer screen member. In U.S. Pat. No. 4,858,691, for example, the wire-cloth fabric mesh is stated to have a mesh size of from about 40 to about 200, which can have a substantially smaller inlet flow area than the inlet flow area of the outer particulate restricting cylinder It will be seen that sand plugging can interfere with the initial development phase of production in wells which are completed by wire cloth fabric mesh screens of the type described in U.S. Pat. No. 4,858,691.

OBJECTS OF THE INVENTION

The principal object of the invention is to provide a prepack sand screen which can exclude sand fines from inflowing formation fluid during the initial production phase following a gravel pack operation, without limiting production of formation fluid.

A related object of the present invention is to maximize the annular placement and retention of aggregate gravel materials in a sand screen having a maximum inner diameter and a minimum outer diameter.

Another object of this invention is to provide an improved prepacked well screen which maximizes the radial thickness of prepack gravel material without imposing a flow restriction or a strength compromise on the inner mandrel.

SUMMARY OF THE INVENTION

The foregoing objects are provided according to a preferred embodiment of the present invention by a prepack well screen assembly having inner and outer screens concentrically mounted in radially spaced relation onto an inner mandrel. The outer screen is radially spaced with respect to the inner screen, thereby defining a prepack annulus for receiving prepack gravel. In both screens, the longitudinal spacing distance between adjacent turns selectively excludes sand fines of a predetermined minimum size. The outer screen wire is substantially greater in size than the corresponding dimension of the inner retention screen wire. Accordingly, the effective inlet flow area through the inner retention screen is more than twice the effective inlet flow area through the outer screen in any selected zone of sand screen interface area. In one embodiment, the inner screen is radially spaced with respect to the mandrel, thereby defining a flow bypass annulus.

Bypass flow passages are established across the entire interface zone between the gravel prepack and flow passages formed in the mandrel. Localized deposits of sand fines on the inner screen are effectively bypassed by the remaining rectangular flow passages formed across the inner screen.

Operational features and advantages of the present invention will be understood by those skilled in the art upon reading the detailed description which follows with reference to the attached drawings.

BRIEF DESCRIPTION OF THE DRAWINGS

FIG. 1 is an elevational view, partially in section and partially broken away, of an oil well completion at a producing zone, with a work string performing a gravel pack operation;

FIG. 2 is a perspective view, partially broken away, of a dual screen prepack assembly constructed according to the teachings of the present invention;

FIG. 3 is an elevational view, partially broken away, of the dual screen prepack assembly shown in FIG. 2;

FIG. 4 is a sectional view of the dual screen prepack assembly taken along the lines 4—4 of FIG. 3;

FIG. 5 is an enlarged sectional view of a portion of the dual screen prepack assembly taken along the lines 5—5 of FIG. 4;

DETAILED DESCRIPTION OF THE PREFERRED EMBODIMENT

Figure 6:
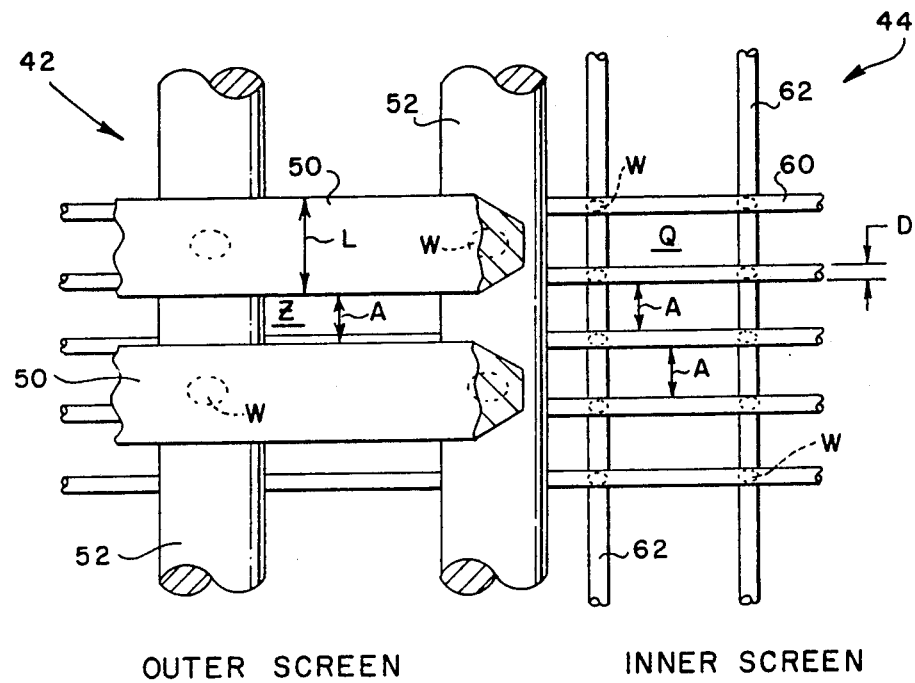
FIG. 6 is an enlarged perspective view of the outer screen and inner screen, partially broken away, of the dual screen prepack assembly shown in FIG. 2.

In the description which follows, like parts are indicated throughout the specification and drawings with the same reference numerals, respectively. The drawings are not necessarily to scale and the proportions of certain parts have been exaggerated to better illustrate details of the invention.

Referring now to FIG. 1 and FIG. 2, a dual screen prepack assembly 10 is shown incorporated in a conventional oil well completion. A well bore 12 has been reinforced by tubular casing 14 and sealed with cement 16. A production tubing 18 has been run inside the casing 14. The casing 14 is perforated by openings 20 at the depth where production fluids are to flow from the producing zone of the well into the production tubing 18.

The sand screen 10 is located opposite the perforations 20 in the casing as the production tubing 18 is run into the well, or it may be run directly opposite an open formation. The annulus between the production tubing and the casing 14 is sealed off by an upper packer 22 and a lower packer 24 to produce formation fluids from the producing zone only.

Flow ports 26 are provided in the tubing string 18 below the upper packer 22 and above the sand screen 10 through which gravel mixed with water or gel is injected or circulated by a service seal unit (SSU) into the annulus 28 between the casing 14 and the sand screen 10. To do so, a wash pipe 30 is run inside the tubing string 18 to spot the gravel slurry of water and/or gel below the sand screen 10 or around a telltale screen 32 which is mounted below the primary sand screen 10. By providing the primary sand screen 10 and the lower telltale screen 32, premature gravel packing around the primary screen is prevented and a sand bridge is thus avoided at that spot.

A polished bore nipple 34 is run between the primary screen 10 and the telltale screen 32 in which the wash pipe 30 is landed in sealing engagement in order to circulate the slurry to the telltale screen 32. In this way, any premature spotting of gravel is prevented When the annulus 28 between the casing 14 and the screen 10 is fully packed, the surface pumps will indicate a pressure jump, which serves to squeeze the remaining water and/or gel from the annulus into the formation. The slurry of gel and gravel is then dehydrated by the oil or gas bearing formation. At the same time, the perforations 20 are filled with gravel. A greater jump in pressure indicates the conclusion of the gravel pack operation. Finally, the wash pipe 30 is pulled out of the polished nipple 34 and the service seal unit SSU is pulled out of engagement with the packer 22 by retraction of a work string 36.

The primary sand screen 10 is illustrated in detail in FIG. 2. The primary sand screen 10 is a dual screen prepacked assembly which includes a perforated tubular mandrel 38 of a predetermined length, for example, 20 feet. The tubular mandrel 38 is perforated by radial bore flow passages 40 which follow parallel spiral paths along the length of the mandrel 38. The bore flow passages 40 provide for fluid flow through the mandrel to the extent permitted by an external screen 42 and an internal screen 44. The bore flow passages 40 may be arranged in any desired pattern and may vary in number in accordance with the area needed to accommodate the expected formation fluid flow through the production tubing 18.

The perforated mandrel 38 preferably is fitted with a threaded pin connection 46 at its opposite ends for threaded coupling with the polished nipple 34 and the production tubing 18. The outer wire screen 42 is attached onto the mandrel 38 at opposite end portions thereof by annular end welds 48.

The outer screen 42 is a fluid-porous, particulate-restricting member which is formed separately from the mandrel 38. In the preferred embodiment, the outer screen 42 has an outer screen wire 50 which is wrapped in multiple turns onto longitudinally extending outer ribs 52, preferably in a helical wrap. The turns of the outer screen wire 50 are longitudinally spaced apart from each other thereby defining rectangular fluid flow apertures Z therebetween for conducting formation fluid flow while excluding sand and other unconsolidated formation material.

As shown in FIG. 5, the outer screen wire 50 is typically 90 mils wide by 140 mils tall in a generally trapezoidal cross section. The maximum longitudinal spacing A between adjacent turns of the outer wire wrap is determined by the maximum diameter of the fines which are to be excluded. Typically, the aperture spacing A between adjacent wire turns is 20 mils. This provides approximately 20 square inches of inlet flow area per linear foot in a screen 10 having an outside diameter of 2.97 inches.

The outer screen wire 50 and the outer ribs 52 are formed of stainless steel or other weldable material and are joined together by resistance welds W at each crossing point of the outer screen wire 50 onto the outer ribs 52 so that the screen 42 is a unitary assembly which is self-supporting prior to being mounted onto the mandrel 38. The outer ribs 52 are circumferentially spaced with respect to each other and have a predetermined diameter for establishing a gravel prepack annulus 54 of an appropriate size for receiving a volume of gravel 56. The longitudinal ribs 52 serve as spacers between the inner screen 44 and the outer screen 42.

The prepacked gravel 56 and the surrounding screen must be capable of withstanding rough run-in handling as well as extreme downhole well production conditions, such as a temperature range of from about 50° C. to about 300° C., a formation fluid pH of from about 6 to about 12, high formation pressure up to about 2,000 psi, and contact with corrosive formation fluids containing sulfurous compounds such as hydrogen sulfide or sulphur dioxide in concentrations up to about 20 g by weight.

The prepack gravel 56 preferably comprise gravel particles which are generally spherical in shape to provide high permeability within the prepack annulus 54. The prepacked gravel 56 is sized appropriately to exclude the sand fines which accompany the formation fluid during initial production. The gravel 56 can be coarse sand, glass or ceramic beads, solid polymeric granules, composite particles having a metal core surrounded by a corrosion resistant metal coating, and the like, which are sized appropriately to permit passage of formation fluid through the consolidated gravel particles while substantially preventing flow of sand and other unconsolidated formation materials therethrough.

In the preferred embodiment, the inner screen 44 is concentrically disposed about the tubular mandrel 38, and is concentrically disposed within the outer screen 42. The inner retention screen 44 is thus stabilized by engagement against the outer longitudinal ribs 52. The prepack annulus 54 is defined between the inner wire screen 44 and the outer wire screen 42.

The fines which are initially produced following a gravel pack operation have a fairly small grain diameter, for example, 20-40 mesh sand. Accordingly, the spacing dimension A (FIG. 5) between adjacent turns of the outer screen wire 50 is selected to exclude sand fines which exceed 20 mesh.

The inner screen 44 is separately formed from the mandrel 38 and from the outer screen 42 by a narrow gauge stainless steel wire 60 which is wrapped onto longitudinally extending inner ribs 62, preferably in a helical wrap. The turns of the inner screen wire 60 are axially spaced apart from each other by the same spacing distance A as the outer screen wire turns 50, thereby providing rectangular fluid flow passages Q for conducting formation fluid while excluding sand fines The inner screen wire 60 and the inner ribs 62 are formed of stainless steel or other weldable material and are joined together by resistance welds W at each crossing point of the inner screen wire 60 onto the inner ribs 62 so that the inner screen 44 is a unitary assembly which is self-supporting prior to being mounted onto the outer screen 42.

After the inner screen 44 has been separately assembled, it is mounted onto the perforated mandrel 38. That is, the mandrel 38 is inserted into the bore of the inner screen 44. Next, the separately assembled outer screen 42 is mounted onto the inner screen/mandrel subassembly. The outer ribs 52, the inner ribs 62, the inner wrapping wire 60 and the outer wrapping wire 50 are welded together onto the lower end of the mandrel 38 by the annular weld 48. The gravel 56 is then loaded into the open prepack annulus 54 at the opposite open end. The gravel 56 is retained within the prepack annulus by the annular weld 48, the outer screen 42 and the inner screen 44. After the gravel 56 has been loaded into the prepack annulus 54, the opposite end portions of the outer longitudinal ribs 54, the inner longitudinal ribs 62, the outer screen wire turns 50 and the inner screen wire 60 are joined together and secured to the upper end of the mandrel 38 by an annular weld 48. According to this arrangement, the dual prepack screen 10 becomes a unitary part of the mandrel 38 and is ready for service.

The inner screen 44 serves two purposes. First, it is a retention screen which retains the gravel 56 within the prepack annulus 54. Moreover, the longitudinal inner ribs 62 stabilize the inner screen wire turns 60 while also serving as a standoff for spacing the inner screen wire turns 60 radially with respect to the external surface of the mandrel 38. According to this arrangement, bypass flow passages are established across the entire interface zone between the gravel prepack 56 and the flow passages 40. That is, localized deposits of sand fines on the inner screen 44 are effectively bypassed by the remaining rectangular flow passages g formed across the inner screen 44.

The outer screen 42 also retains the gravel 56 within the prepack annulus 54. The outer longitudinal ribs 52 provide radial spacing between the inner screen 44 and outer screen 42, thereby centering the inner screen concentrically within the outer screen.

According to an important feature of the invention, production flow is not limited or blocked by such localized accumulation of fines on the inner screen 44 for the reason that the effective inlet flow area of the inner retention screen 44 is substantially greater than the effective inlet flow area of the outer screen 42. This is made possible by selecting the size of the screen wire 60 and the longitudinal rib 62 of the inner screen to be substantially smaller than the corresponding screen wire 50 and longitudinal rib 52 of the outer screen. A limitation on the inner screen wire size is the minimum diameter of the rib 62 and the circumferential spacing of the ribs 62 to provide standoff clearance of the inner wire 60 with respect to the external surface of the perforated mandrel 38, and also the minimum size required whereby the inner wire 60 can be reliably joined to the rib 62 by resistance welding techniques. The diameters of both the inner rib 62 and the inner screen wire 60 are preferably in the range of from about 0.016 inch to about 0.055 inch.

Referring now to FIG. 6, it is obvious by inspection that the effective inlet flow area of the inner retention screen 44 is substantially greater than the inlet flow area of the outer screen 42. In both screens, the longitudinal spacing distance (A) between adjacent turns is equal. However, the outer screen wire is substantially greater in the longitudinal dimension L than the diameter D of the inner retention screen wire 60. In the exemplary embodiment of FIGURE 6, the outer screen wire 50 has a generally trapezoidal cross section, and is joined by a resistance weld W onto the underlying rib 52. In the exemplary embodiment. The longitudinal width dimension L of the outer wire 50 in this example is 90 mils. The corresponding longitudinal diameter dimension D of the inner wire 60 is 20 mils. Accordingly, the effective inlet flow area through the inner retention screen 44 is more than twice the effective inlet flow area through the outer screen 42 in any selected zone of sand screen interface area.

Another advantage of the radially offset inner screen arrangement as shown in FIG. 6 is that bridging or plugging of the inner rectangular flow passages is unlikely to occur because the surface area of the inner wire turns 60 and the inner longitudinal ribs 62 which frame the rectangular flow passages Q are relatively narrow and provide only minimum subjacent support for a sand bridge or plug. In the woven wire mesh arrangement disclosed in U.S. Pat. No. 4,858,691, the wire mesh is wrapped directly onto the mandrel, with the mandrel providing subjacent support on which a sand bridge or plug can more readily be established.

Figure 7:
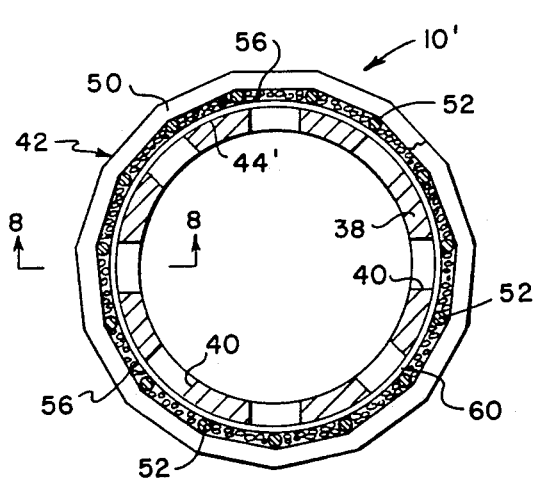
FIG. 7 is a sectional view of an alternative embodiment of the dual screen prepack assembly; and, FIG. 8 is an enlarged perspective view of the outer screen and inner screen, partially broken away, of the dual screen prepack assembly shown in FIG. 7.
Figure 8:
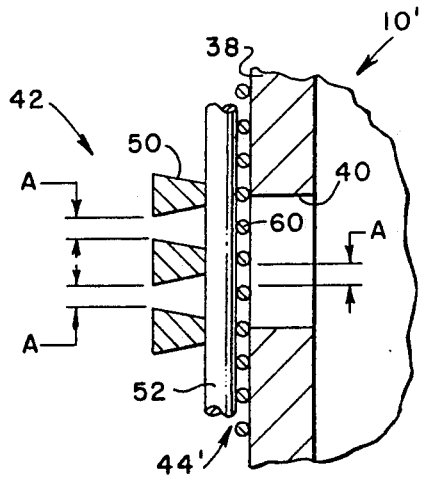

Referring now to FIGS. 7 and 8, an alternative dual screen prepack assembly 10' is illustrated. In this alternative embodiment, the inner screen wire 60 is wrapped directly onto the mandrel 38 with adjacent turns being spaced by a longitudinal distance A. That is, the longitudinally extending rib wires 62 are not utilized in this alternative embodiment. Instead, the inner screen wire 60 is wrapped directly onto the perforated mandrel 38, for example, by the method as disclosed in U.S. Pat. No. 3,785,409; U.S. Pat. No. 3,958,634; and U.S. Pat. No. 3,908,256, all assigned to the assignee of the present invention, Howard Smith Screen Company of Houston, Tex.

In this alternative embodiment, the longitudinal spacing distance A between adjacent inner screen wire turns 60 is preferably equal to the longitudinal spacing distance A between the outer screen wire turns 50. The alternative dual screen embodiment 10' is identical to the preferred dual screen embodiment 10, except that the longitudinally extending inner rib wires 62 are not utilized, and the inner screen wire 60 is wrapped directly onto the perforated mandrel 38. Fluid flow through the flow apertures Q of the inner screen 44' occurs only through the area of the inner screen 44' which overlaps the mandrel flow apertures 40. However, it will be appreciated that the effective inlet flow area through the inner retention screen 44' is substantially greater than the effective inlet flow area through the outer screen 42 in any selected zone of the sand screen interface area. This is achieved by making the inner screen wire 60 substantially smaller in diameter than the longitudinal dimension L of the outer screen wire 50, while maintaining the adjacent turn spacing distances A substantially equal. In this particular embodiment, the effective inlet flow area through the inner retention screen 44' is more than twice the effective inlet flow area through the outer screen 42 in any selected zone of sand screen interface area.

Although the invention has been described with reference to an oil well completion, and with reference to a particular preferred embodiment, the foregoing description is not intended to be construed in a limiting sense. Various modifications of the disclosed embodiment as well as alternative applications, for example, filtering unconsolidated material out of inflowing well fluid in water, gas and oil wells, and environmental wells, including monitoring wells, recovery wells and disposal wells, will be suggested to persons skilled in the art by the foregoing specification and illustrations. It is therefore contemplated that the appended claims will cover any such modifications or embodiments that fall within the true scope of the invention.

What is claimed is:

1. A sand screen assembly for separating particulated material from formation fluid comprising, in combination:

a perforated mandrel;

an inner wire screen mounted onto said perforated mandrel, said inner wire screen having circumferentially spaced, longitudinally extending inner rib wires engaging said mandrel and an inner screen wire wrapped externally about said inner rib wires in a longitudinally spaced pattern, said inner screen wire being welded to said inner rib wires at substantially all points of contact therewith, thereby defining longitudinally spaced inner screen apertures for conducting fluids through said inner screen;

a fluid-porous, particulate-restricting member mounted onto said mandrel in radially spaced relation with respect to said inner wire screen, thereby defining a prepack annulus therebetween said fluid-porous, particulate-restricting member including circumferentially spaced, longitudinally extending outer rib wires and a screen wire wrapped externally about said outer rib wires in a longitudinally spaced pattern thereby defining longitudinally spaced screen apertures for conducting formation fluids through said outer screen, said longitudinally extending outer rib wires being disposed in said prepack annulus; and, a permeable gravel deposit disposed within said prepack annulus.

2. A sand screen assembly as defined in claim 1, wherein the diameter of said inner screen wire is substantially smaller than the diameter of said outer screen wire.

3. A sand screen assembly as defined in claim 1, wherein the longitudinal spacing between adjacent outer screen wires being substantially equal to the longitudinal spacing between adjacent inner screen wires.

4. A sand screen assembly as defined in claim 1, wherein the diameter of the inner screen wire is in the range of from about 0.016 inch to about 0.055 inch.

5. A sand screen assembly as defined in claim 1, wherein the diameter of the inner rib wires is in the range of from about 0.016 inch to about 0.055 inch.

6. A sand screen for placement within a well bore comprising, in combination:

an elongated tubular mandrel having a plurality of longitudinally spaced apertures formed radially therethrough;

an inner wire screen mounted onto said mandrel, said inner wire screen having circumferentially spaced, longitudinally extending inner rib wires and a screen wire wrapped externally about said inner rib wires in a longitudinally spaced pattern, said inner screen wire being welded to said inner rib wires at substantially all points of contact therewith, thereby defining longitudinally spaced inner screen apertures for conducting fluids through said inner screen;

an outer wire screen mounted onto said mandrel in substantially concentric alignment with said inner screen, said outer wire screen having circumferentially spaced, longitudinally extending outer rib wires and an outer screen wire wrapped externally about said outer rib wires and welded thereto at substantially all points of contact therewith, thereby defining longitudinally spaced outer screen apertures for conducting formation fluids through said outer screen;

an annular weld formed on said mandrel and connecting the end portions of said inner and outer screen wires and said inner and outer rib wires together for centering said inner screen in radially spaced relation within said outer screen, thereby defining a prepack annulus; and, a permeable gravel deposit disposed within said prepack annulus.

7. A sand screen assembly for separating particulated material from formation fluid comprising, in combination:

a perforated mandrel;

an inner wire screen mounted onto said perforated mandrel, said inner wire screen having inner screen wire turns wrapped directly onto said perforated mandrel in a longitudinally spaced pattern, thereby defining longitudinally spaced inner screen apertures which are coincident with the flow apertures of said perforated mandrel;

a fluid-porous, particulate-restricting member mounted onto said mandrel in radially spaced relation with respect to said inner wire screen, thereby defining a prepack annulus therebetween, said fluid-porous, particulate-restricting member including circumferentially spaced, longitudinally extending outer rib wires mounted onto said inner wire screen and having an outer screen wire wrapped externally about said outer rib wires in a longitudinally spaced pattern thereby defining longitudinally spaced screen apertures for conducting formation fluid through said outer screen, said longitudinally extending outer rib wires being disposed in said prepack annulus; and, a fluid, permeable gravel deposit disposed within said prepack annulus.

8. A sand screen assembly as defined in claim 7, diameter of said inner screen wire is substantially smaller than the diameter of said outer screen wire.

9. A sand screen assembly as defined in claim 7, wherein the longitudinal spacing between adjacent outer screen wires being substantially equal to the longitudinal spacing between adjacent inner screen wires.

10. A sand screen assembly as defined in claim 7, wherein the diameter of the inner screen wire is in the range of from about 0.016 inch to about 0.055 inch.

11. A sand screen assembly as defined in claim 7, wherein the diameter of the inner rib wires in the range of from about 0.016 inch to about 0.055 inch.

* * * * *